United States Patent
Sagan

(10) Patent No.: US 9,373,277 B2
(45) Date of Patent: Jun. 21, 2016

(54) EXTENDING DYNAMIC RANGE OF A DISPLAY

(71) Applicant: BAE Systems Information and Electronics Systems Integration Inc., Nashua, NH (US)

(72) Inventor: Stephen F. Sagan, Lexington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 420 days.

(21) Appl. No.: 13/922,305

(22) Filed: Jun. 20, 2013

(65) Prior Publication Data

US 2013/0342591 A1    Dec. 26, 2013

Related U.S. Application Data

(60) Provisional application No. 61/662,412, filed on Jun. 21, 2012.

(51) Int. Cl.
G09G 5/02 (2006.01)
G09G 3/20 (2006.01)
G02F 1/1335 (2006.01)

(52) U.S. Cl.
CPC ........ *G09G 3/2007* (2013.01); *G02F 1/133509* (2013.01)

(58) Field of Classification Search
None
See application file for complete search history.

(56) References Cited

U.S. PATENT DOCUMENTS

| | | | |
|---|---|---|---|
| 5,468,064 A | 11/1995 | Lengyel et al. | |
| 6,140,986 A | 10/2000 | Wilkinson et al. | |
| 6,847,173 B2 | 1/2005 | Berthou et al. | |
| 2004/0001184 A1* | 1/2004 | Gibbons | H04N 5/20 353/31 |
| 2007/0195405 A1 | 8/2007 | Maner et al. | |
| 2007/0235634 A1 | 10/2007 | Ottney et al. | |
| 2007/0279368 A1 | 12/2007 | Shefter | |
| 2008/0157000 A1 | 7/2008 | Shamir et al. | |
| 2009/0009848 A1 | 1/2009 | Bolle et al. | |
| 2009/0141327 A1* | 6/2009 | Penn | G02B 26/125 359/201.1 |
| 2009/0189548 A1 | 7/2009 | Hoffman et al. | |
| 2009/0225531 A1 | 9/2009 | Praiswater | |
| 2009/0322794 A1* | 12/2009 | Lowe | G09G 3/20 345/690 |

* cited by examiner

*Primary Examiner* — Nicholas Lee
(74) *Attorney, Agent, or Firm* — Sand & Sebolt, LPA; Daniel J. Long

(57) ABSTRACT

A method for extending dynamic range of a display that can attenuate brightness to match scene brightness is disclosed. Standard RGB sub pixel filtering as well as neutral density sub pixel filtering is performed. The color addressability of the display is utilized to extend the dynamic range of the emitted energy by more than one order of magnitude with the standard RGB sub pixel filtering. The standard filtering extends the dynamic range of the emitted energy by more than one order of magnitude, while the neutral density filtering extends the dynamic range of the emitted energy by two or more orders of magnitude.

16 Claims, 5 Drawing Sheets

EXTENDING DYNAMIC RANGE OF A DISPLAY

CROSS-REFERENCE TO RELATED APPLICATIONS

This Application claims rights under 35 USC §119(e) from U.S. Application Ser. No. 61/662,412 filed 21 Jun. 2012 the contents of which are incorporated herein by reference.

TECHNICAL FIELD

Embodiments are generally related to night vision goggle displays. Embodiments are also related to wide range attenuation-capable displays. Embodiments are additionally related to a method for extending dynamic range of a night vision display.

BACKGROUND OF THE INVENTION

For combat soldiers, law enforcement personnel, and others, who are exposed to potential dangerous situation, the ready availability of information is essential in all environmental conditions. A Night Vision Device (NVD) is an optical instrument for producing images in levels of light approaching total darkness. NVD usually refers to a complete unit, including an image intensifier tube, a protective and generally water-resistant housing, and a mounting system. Many NVDs also include sacrificial lenses, IR illuminators, and telescopic lenses.

Low-light imaging, near-infrared illumination and thermal imaging are the common methods for achieving Night Vision. The most common applications of night vision systems are situational awareness, target cueing, night driving or flying, night security and surveillance, wildlife observation, sleep lab monitoring and search and rescue.

Night vision goggles generally are required to operate over scene luminance levels ranging from less than 1e−6 ($1.0*10^{-6}$) fc (foot-candles) to more than 1 fc; a range of at least six orders of magnitude. The night vision goggles collect light over a broad wavelength spectrum, typically 500 nm to 900 nm for GEN III tubes, then amplify and convert the scene with a monochrome green phosphor, generally peaked around 540 nm. The image created is then displayed to the eye at about 1 to 2 fL (foot-lamberts).

A clip-on thermal imager, which are designed, to convert IR scene energy to visible or near IR and inject/project that converted scene into a night vision goggle must do their work at luminance levels compatible with the native night vision goggle near IR scene (i.e. operate over a dynamic range of 1e+6 or greater). Organic Light Emitting Diode (OLED) displays are generally limited to a dynamic range of less than five orders of magnitude or 1e+5:1, defined here as the ratio of the highest luminance level to the lowest addressable linear gray level. Given the limitations of the display threshold (lowest ON value) and pixel noise (variation in luminance for a given ON value), larger dynamic ranges would typically be achieved by operating the display to higher brightness levels, but with negative consequences of high power consumption and fess display life time. Current display systems do not cover larger dynamic range with wide range of attenuation capabilities.

Decker, U.S. Pat. No. 5,380,204 discloses a night vision goggle aided flight simulation system and technique that allows a flight simulator operator wearing night vision goggles to view an approximate simulation of night vision goggle aided flight. A processor generates at least one look-up table of brightness values utilizing database sources including any selected options. A scene generation computer will then generate the scene image with the contrast based on values provided by the look-up table. An image display system displays the scene at light levels with sufficient dynamic range so that approximate simulation of night vision goggle aided flight is achieved. A neutral density filter can be placed over a CRT display if the CRT display as the display system cannot produce sufficient dynamic range.

Whitehead et al., U.S. Pat. No. 7,801,426 discloses a display having a screen which incorporates a light modulator. The screen may be a front projection screen or a rear-projection screen. Elements of the light modulator may be controlled to adjust the intensity of light emanating from corresponding areas on the screen. The display may provide a high dynamic range.

Ben-David et al., U.S. Pat. No. 8,248,440 discloses a color Liquid Crystal display (LCD) device for displaying a color image using at least four different primary colors, the device including as array of Liquid Crystal (LC) elements, driving circuitry adapted to receive an input corresponding to the color image and to selectively activate the LC elements of the LC array to produce an attenuation pattern corresponding to a gray-level representation of the color image, and an array of color sub-pixel filter elements juxtaposed and in registry with the array of LC elements such that each color sub-pixel filter element is in registry with one of the LC elements, wherein the array of color sub-pixel filter elements comprises at least four types of color sub-pixel filter elements, which transmit light of the at least four primary colors, respectively.

Ciurea, U.S. Pat. Application No. 20070242141 discloses an apparatus and method that extend the graduated neutral density filter approach by implementing an in-camera adjustable neutral density filter. The adjustable neutral density filter is implemented by the means of a transmissive LCD. The transmissive LCD is controlled to form a mask image. This mask image is able to be computed using an acquired signal wherein the acquired signal is then inverted and blurred. in an embodiment, a splitter and an additional sensor are utilized to acquire a split signal and then modify the split signal for use as the mask image. The other split signal is filtered through the mask image and transmissive LCD. Images with a high dynamic range compression are ultimately captured.

Malka et al., U.S. Pat. Application No. 20090179826 discloses methods and systems for displaying an image on a display, for example, a liquid crystal display (LCD) having more than three different colored filters. The display may include a plurality of sub-pixels, each of the sub-pixels being aligned with a filter having a color selected from a set of more than three different colors, none of which is white. A number of methods and systems for processing data for display are disclosed, for example, using data points from adjacent pixel groups, or data points for different colors within the same pixel data set.

A need therefore exists for display that covers a dynamic range greater than $1:10^5$. A need also exists for the ability to attenuate brightness (amplitude) to match average scene brightness.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the present invention to provide for night vision goggle displays It is another aspect of the disclosed embodiment to provide for wide range attenuation-capable displays.

It is a further aspect of the disclosed embodiment to provide to a method for extending the dynamic range of a night vision display.

The aforementioned aspects and other objectives and advantages can now be achieved as described herein. An extended dynamic range display that can attenuate brightness to match scene brightness is disclosed. The invention uses the color addressability of the display to extend the dynamic range of the emitted energy (using individual and sums of the R, G and B sub pixel energy without regard to the actual color i.e. monochrome) by more than one order of magnitude with the standard RGB sub pixel filtering. The emitted energy can be extended by two or more orders of magnitude with neutral density filtering of the sub pixel for example 1, 1e−1, & 1e−2 for 1e2; or 1, 1e−2, & 1e−4 for 1e4.

In one embodiment, additional attenuation control options include fixed & variable filter for example LC shutter, variable neutral density etc, frame blanking, spatial control (use SXGA in VGA mode and drop pixels), and display gamma (one user definable table).

In another embodiment, a monochrome image is displayed, addressing portions of the display that are normally associated with color (tailored and/or filtered) to affect amplitude. The display may control the amplitude of the illumination from a self or direct illumination display such as an eMagin organic light emitting diode or OLEO on a pixel by pixel basis. The display may also use one or more static tailored filters, as opposed to adjustable filters.

Yet another embodiment uses existing emissive triad color displays "as-is" or modifies the coatings to provide an extended dynamic range of more than an order of magnitude.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

DETAILED DESCRIPTION

The particular values and configurations discussed in these non-limiting examples can be varied and are cited merely to illustrate at least one embodiment and are not intended to limit the scope thereof.

Figure 1:
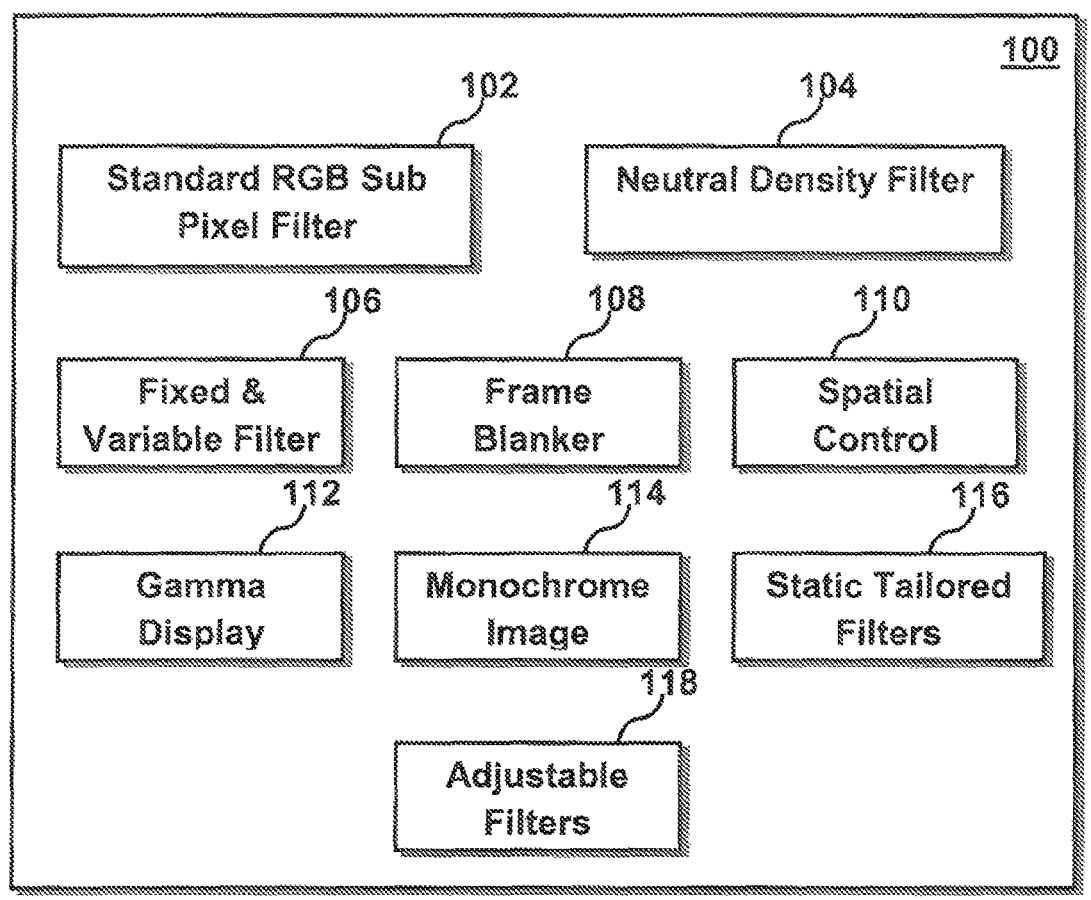
FIG. 1 illustrates a block diagram of an extended dynamic range display, in accordance with the disclosed embodiments.

Referring to FIG. 1, a block diagram of an extended dynamic range display 100 that can attenuate brightness to match scene brightness is disclosed. Color addressability of the display 100 is utilized to extend the dynamic range of the emitted energy by more than one order of magnitude by utilizing a standard RGB sub pixel filter 102. The emitted energy can be extended by two or more orders of magnitude by utilizing a neutral density filter 104 of the sub pixel for example 1, 1e−1, & 1e−2 for 1e2; or 1, 1e−2, & 1e−4 for 1e4. Note that the dynamic range of the display 100 is extended by utilizing individual and sums of the R, G and B sub pixel energy without regard to the actual monochrome color.

In one embodiment, additional attenuation control options include fixed & variable filter 106, frame blanker 108, spatial control 110 and gamma display 112. The fixed & variable filter 106 includes LC shutter and variable neutral density. Spatial control use Super eXtended Graphics Array (S GA) in Video Graphics Array (VGA) mode and drop pixels and gamma represents one user definable table.

A monochrome image 114 is displayed, addressing portions of the display that are normally associated with color (tailored and/or filtered) to affect amplitude. The display may control the amplitude of the illumination from a self or direct illumination display such as an eMagin organic light emitting diode or OLED on a pixel by pixel basis. The display may also use one or more static tailored filters 116, as opposed to adjustable filters 118. Note that the present invention utilizes existing emissive triad color displays "as-is" or modifies the coatings to provide an extended dynamic range of more than an order of magnitude.

In general, in photography and optics, a neutral density filter or ND filter is a filter that reduces or modifies intensity of all wavelengths or colors of light equally, giving no changes in hue of color rendition. It can be a colorless (clear) or grey filter. The purpose of a standard photographic neutral density filter is to allow the photographer greater flexibility to change the aperture, exposure time and/or motion blur of subject in different situations and atmospheric conditions.

Also, the most elementary representation corresponds to the binary image, for which each pixel can take only one value among two. For monochrome images, each pixel can take one value among N. N is generally a power of 2, thus facilitating the image representation in the computer. For example, for a gray-level image, each pixel can take one value among 256: this value is then encoded by a data byte. This representation is frequently used and finds a justification involving the human visual system and the physical characteristics of the image support.

A tri-chrome image (or color image) is a superposition of three gray-level images corresponding to three basic colors. For images that will be displayed on a computer screen, the RGB (red, green, blue) representation is used. Each pixel of a tri-chrome image is thus associated with a triplet of values corresponding to the luminance of the basic colors. This representation is not the only one allowing color images to be processed by a computing system. An alternative consists in using indexed color images, associating the matrix of pixels with a color table (color map). More precisely, in this case, each pixel value is an index pointing to the color table. The color table is composed of three columns corresponding to the three basic colors. The number of rows in the table is equal to the total number of colors used for the representation. The indexed color representation is more cost-effective in terms of memory occupancy than the RGB representation since the number of colors is voluntarily limited. Therefore, it is also less precise in terms of image definition.

Images obtained through snapshots in the visible range are not the only ones to find applications, and multi-spectral images are a generalization of the previous case. They are represented by n tables of numbers.

Figure 2:
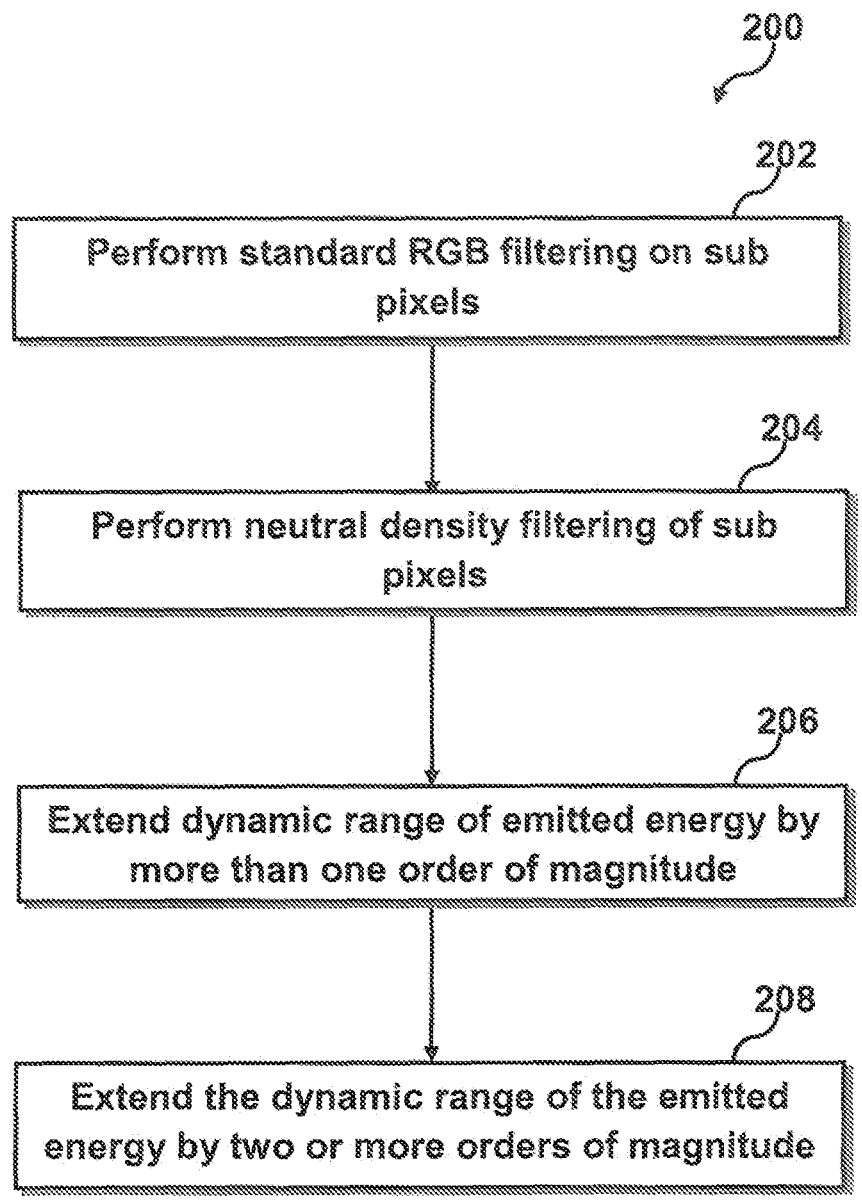
FIG. 2 illustrates a flow chart of a method for extending the dynamic range of the display depicted in FIG. 1, in accordance with the disclosed embodiments.

Referring to FIG. 2, a flow chart 200 illustrating a method for extending the dynamic range of the display 100 depicted in FIG. 1 is disclosed. Standard RGB sub pixel filtering and neutral density sub pixel filtering is performed as said at block 202 and 204. The color addressability of the display is utilized to extend the dynamic range of the emitted energy by more than one order of magnitude with the standard RGB sub pixel filtering. As depicted at block 206 and 208, the standard filtering extends the dynamic range of the emitted energy by more than one order of magnitude, while the neutral density filtering extends the dynamic range of the emitted energy by two or more orders of magnitude.

Figure 3:
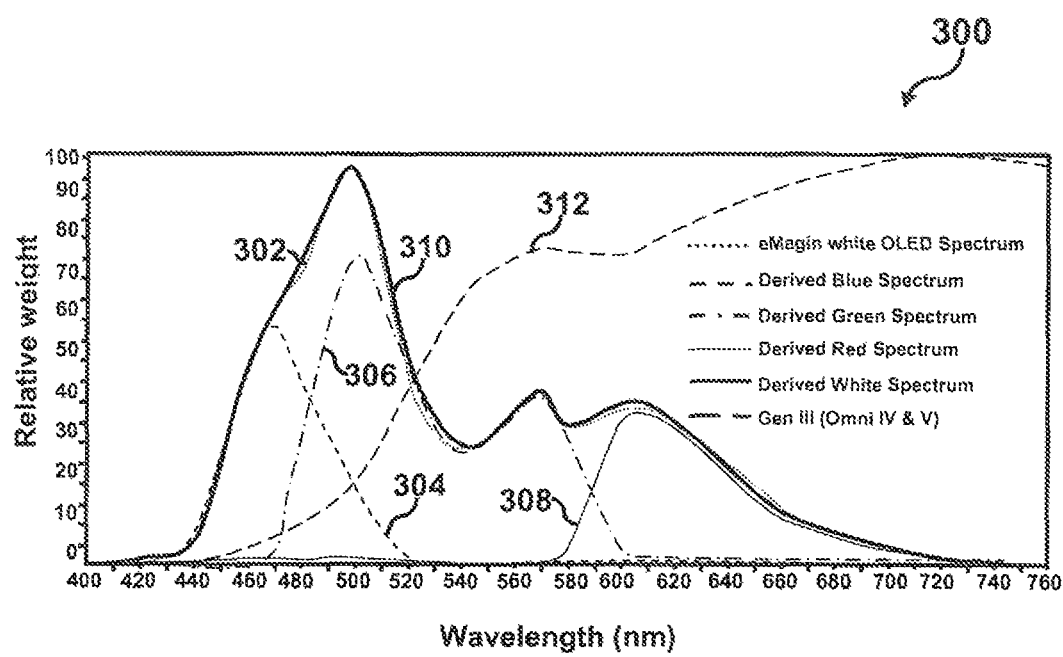
FIG. 3 illustrates a wavelength versus relative weight graph for the XL-OLED RGB color spectrum, in accordance with the disclosed embodiments.
Figure 4:
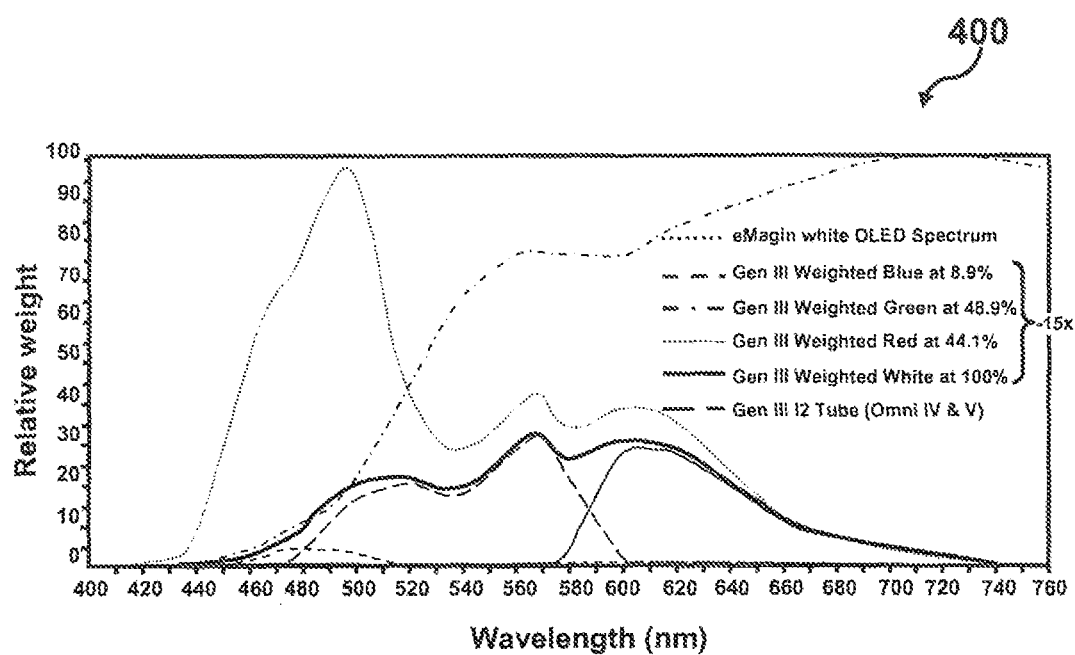
FIG. 4 is a wavelength versus relative weight graph for a Gen. III weighted eMagin spectrum in accordance with the disclosed embodiments.
Figure 5:
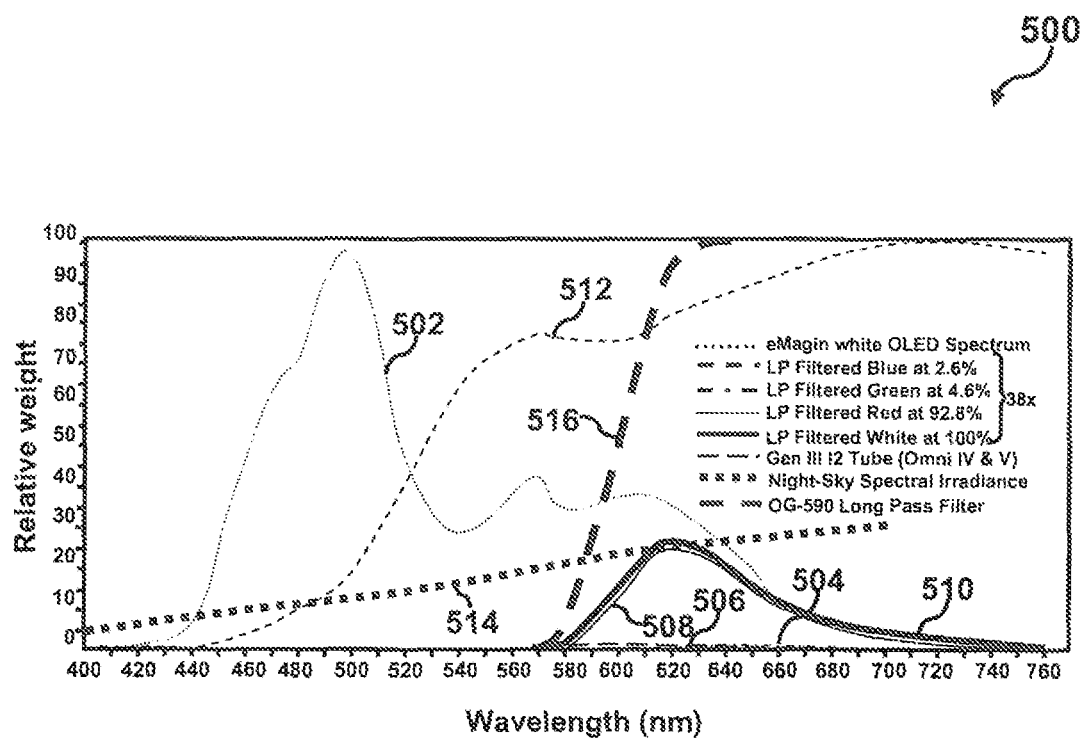
FIG. 5 is a wavelength versus relative weight graph for an eMagin spectrum with Gen. III and a long pass filter in accordance with the disclosed embodiments.

Referring to FIGS. 3-5, a graph 300 of wavelength versus relative weight for the XL-OLED RGB color spectrum is shown in FIG. 3. As shown in FIG. 3, the reference numerals 302, 304, 306, 308, 310 and 312 represents eMagin white OLED spectrum, derived blue spectrum, derived green spectrum, derived red spectrum, derived white spectrum and Gen III (Omni IV & V) respectively.

FIG. 4 shows wavelength versus relative weight graph 400 for a Gen. III weighted eMagin spectrum. As shown in FIG. 4, the reference numerals 402, 404, 406, 408, 410 and 412 represents eMagin white OLED spectrum, Gen III weighted blue at 8.9%, Gen III weighted green at 48.9%, Gen III weighted red at 44.1%, Gen III weighted white at 100%, Gen III I2 Tube (Omni IV & V) respectively. FIG. 5 shows a similar wavelength versus relative weight graph 500 for an eMagin spectrum with Gen. III and a long pass filter. In FIG. 5 as shown, the reference numerals 502, 504, 506, 508, 510, 512, 514 and 516 represents eMagin white OLED spectrum, LP filtered blue at 2.6%, LP filtered green at 4.6%, LP filtered red at 92.8%, LP filtered white at 100%, Gen III I2 Tube (Omni IV & V), night-sky spectral irradiance and OG-590 long pass filter respectively.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for increasing dynamic range of a Red-Green-Blue display with red, green, and blue sub pixels comprising:
    performing Red-Green-Blue filtering on said sub pixels; and
    performing neutral density filtering on said sub pixels to extend the dynamic range of emitted energy by at least two orders of magnitude.

2. The method of claim 1 further comprising attenuating brightness of said display to match scene brightness.

3. The method of claim 1 further comprising fixed and variable filtering, frame blanking and spatial control.

4. The method of claim 1 wherein the standard Red-Green-Blue filtering extends the dynamic range of emitted energy by more than one order of magnitude.

5. The method of claim 1 wherein color addressability of said display is utilized to extend dynamic range of emitted energy.

6. The method of claim 1 wherein color addressability uses individual and sums of said red, green, and blue sub pixel energy without regard to actual monochrome color.

7. The method of claim 1 wherein a monochrome image is displayed, addressing portions of said display that is normally associated with color to affect amplitude.

8. A method for increasing dynamic range of a Red-Green-Blue display with red, green, and blue sub pixels comprising:
    performing Red-Green-Blue filtering on said sub pixels;
    performing neutral density filtering on said sub pixels to extend the dynamic range of emitted energy by at least two orders of magnitude;
    attenuating brightness of said display to match scene brightness; and
    performing fixed and variable filtering, frame blanking and spatial control.

9. The method of claim 8 wherein the standard Red-Green-Blue filtering extends the dynamic range of emitted energy by more than one order of magnitude.

10. The method of claim 8 wherein color addressability of said display is utilized to extend dynamic range of emitted energy.

11. The method of claim 8 wherein color addressability uses individual and sums of said red, green, and blue sub pixel energy without regard to actual monochrome color.

12. The method of claim 8 wherein a monochrome image is displayed, addressing portions of said display that is normally associated with color to affect amplitude.

13. A method for increasing dynamic range of a Red-Green-Blue display with red, green, and blue sub pixels comprising:
    performing Red-Green-Blue filtering on said sub pixels;
    performing neutral density filtering on said sub pixels to extend the dynamic range of emitted energy by at least two orders of magnitude;
    attenuating brightness of said display to match scene brightness; and
    performing fixed and variable filtering, frame blanking and spatial control, wherein the standard Red-Green-Blue filtering extends the dynamic range of emitted energy by more than one order of magnitude.

14. The method of claim 13 wherein color addressability of said display is utilized to extend dynamic range of emitted energy.

15. The method of claim 13 wherein color addressability uses individual and sums of said red, green, and blue sub pixel energy without regard to actual monochrome color.

16. The method of claim 13 wherein a monochrome image is displayed, addressing portions of said display that is normally associated with color to affect amplitude.

* * * * *